Dec. 12, 1939.  A. J. LENOX  2,183,460

VARIABLE-SPEED GEARING

Filed Jan. 28, 1939  3 Sheets-Sheet 1

Inventor
Andrew J. Lenox
by
Mason & Porter
Attorneys

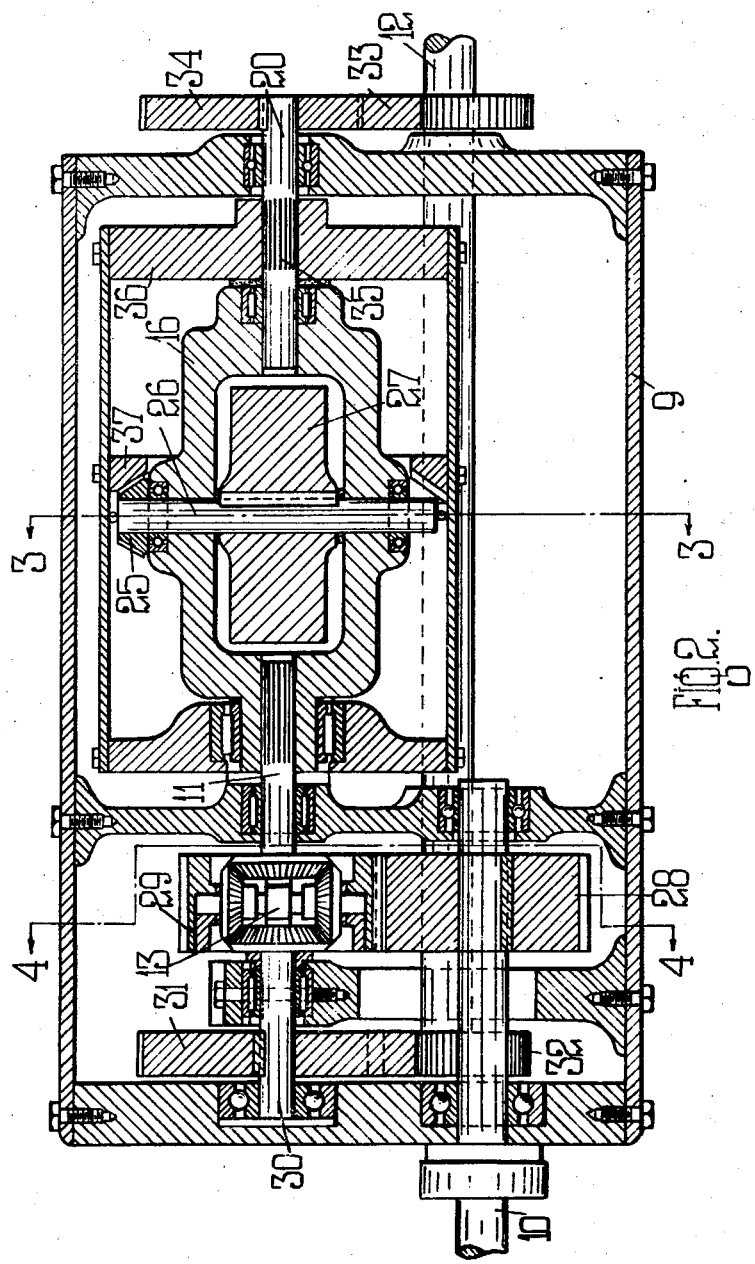

Dec. 12, 1939.  A. J. LENOX  2,183,460
VARIABLE-SPEED GEARING
Filed Jan. 28, 1939  3 Sheets-Sheet 3

Inventor
Andrew J. Lenox
by
Mason & Porter
Attorneys

Patented Dec. 12, 1939

2,183,460

UNITED STATES PATENT OFFICE 2,183,460

VARIABLE-SPEED GEARING

Andrew James Lenox, Kingston-upon-Hull, England

Application January 28, 1939, Serial No. 253,422 In Great Britain January 29, 1938

8 Claims. (Cl. 74—259)

The present invention relates to variable-speed gearing of power transmission apparatus and has for its object the provision of relatively simple yet efficient means for enabling the elimination of a clutch and the necessity for manual gear changing.

The apparatus of the present invention is applicable to road or rail vehicles, aircraft, ships, or again to power plants of a stationary character.

According to the present invention and from one aspect thereof, the inertia effect of a rotary flywheel is adapted to brake one of a pair of differentially driven shafts coupled to a power input shaft through a differential gear, to transmit power from said input shaft through the differential gear to an output or propeller shaft constituting or coupled to the other shaft of the differentially driven pair.

From another aspect of the present invention a power input shaft drives a differential gear with which is associated two differentially driven shafts one of which constitutes or is coupled to the propeller shaft for the mechanism to be driven and has means for driving a flywheel about its own axis and the other of which is coupled to means for driving said flywheel about an axis at right angles to the flywheel axis, a gear connection being provided between said driving means.

From a still further aspect of the present invention a power shaft is coupled through a differential gear with a pair of differentially driven shafts, one of which constitutes, or is coupled to, the propeller shaft of the device or devices to be driven and the other of which is connected to the first through a rotary cage and flywheel, the inertia effect produced by rotation of the flywheel about an axis normal to that of the cage operating to vary the relative speeds of rotation of the differentially driven shafts.

Where the invention is applied to driving the road wheels of a vehicle the propeller shaft constituted by or coupled to one of the differentially driven shafts is in turn adapted to drive a differential to which the road wheels of a pair on opposite sides of a vehicle are coupled.

Where the invention is applied to stationary plant, however, one of the differentially driven shafts referred to above may constitute the usual power shaft of the machine to be driven or the power shaft from which a number of machines receive their drive.

The invention is more particularly described with reference to the accompanying drawings, in which—

Figure 2 is a longitudinal section through a practical form of construction suitable for use on vehicles such as motor-cycles, automobiles or other road vehicles.

Figure 1:
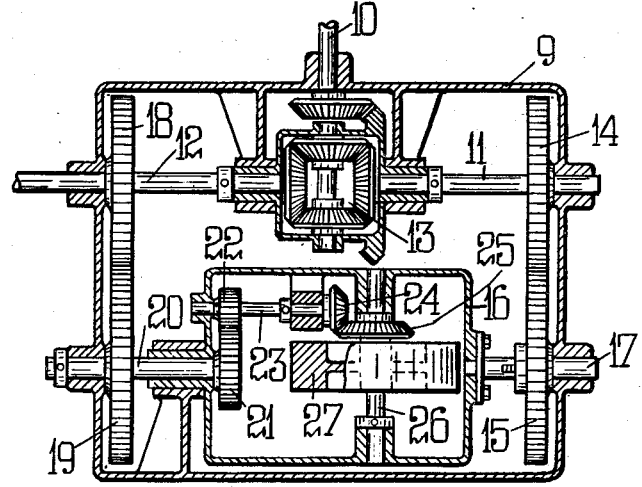
Figure 1 shows diagrammatically a simple form of construction of the present invention.

In the diagrammatic form of construction shown in Figure 1 of the drawings a power input shaft 10, through a differential gear 13, is adapted to drive a power output shaft 12 which constitutes one of a pair of differentially driven shafts the other of which is indicated at 11. In the case of vehicles the shaft 12 may be the propeller shaft constituted by or coupled to one of a pair of differentially driven shafts (not shown) in the vehicle or in the case of stationary plant it may constitute the usual power shaft of a machine or machines (not shown) to be driven. The shafts 11 and 12 are driven in the same direction by the shaft 10.

The differentially driven shaft 11 has keyed thereto a spur wheel 14 which is in mesh with a spur wheel 15 adapted to rotate with a cage 16 about a shaft 17.

The power output or differentially driven shaft 12 has keyed thereto a spur wheel 18 adapted to mesh with a spur wheel 19 of a countershaft 20, one end of which like the shafts 11, 12 and 17, is mounted in bearings in a housing 9, and the other end of which is mounted in a bearing of the cage 16.

On that end of the countershaft 20 which projects into the cage 16 there is keyed a sun wheel 21 with which a planet wheel or pinion 22 is adapted to mesh, said planet wheel 22 being carried on an intermediate or lay shaft 23 which, during rotation of the cage 16, revolves with the cage about the axis thereof. The intermediate or lay shaft 23 carries a bevel wheel 24 which meshes with a bevel wheel 25 of a flywheel shaft 26 located diametrally of the cage 16 the flywheel shaft carrying a flywheel 27 adapted to rotate about the axis of the shaft 26, i. e., at right angles to the axis of rotation of the cage.

In operation, power is transmitted from an engine or other source of power supply (not shown) to the differentially driven shafts 11, 12, through the differential gearing 13.

At one limit of relative speeds of the differentially driven shafts 11 and 12 when resistance to movement of the shaft 12 obtains, such as for example, on starting with a heavy load, the shaft 12 is substantially stationary and the shaft 11 is driven. As a result of this the cage 16 is rotated through the spur wheels 14, 15, while the spur wheels 18, 19, and the sun wheel 21 remain stationary. It follows that on rotation of the cage with the sun wheel 21 stationary, the planet wheel 22 planetates about the sun wheel 21 causing rotation of the intermediate shaft 23 and the bevel wheels 24, 25, to rotate the flywheel shaft 26 and the flywheel 27.

As the torque on the shaft 10 increases so does the angular rotation of the flywheel 27 about its own axis increase until the inertia effect exerted by the flywheel, in rotating about an axis at right angles to the axis of rotation of the cage, tends to retard said cage rotation. This in turn creates a resistance to rotation of the shaft 11 and permits of the application of power supply to the shaft 12.

At the other limit of relative speeds of the differentially driven shafts 11, 12, the drive is from the shaft 10 through the differential gear direct to the shaft 12, the shaft 11, spur wheel 14, 15, and cage 16 remaining stationary.

During rotation of the shaft 12 the countershaft 20 also rotates by virtue of the fact that the spur wheel 18 meshes with the spur wheel 19 and rotation of the shaft 20 causes rotation of the sun wheel 21 to effect rotation of the planet wheel 22 about the axis of the shaft 23, whereby the flywheel 27 is also rotated. Rotation of the flywheel in turn has an inertia effect tending to maintain the cage in its stationary condition.

During rotation of the shaft 12 and in the event of resistance to rotation thereof being increased, it follows that the speed of the shaft 12 tends to decrease as do also the speeds of the shaft 20 and the flywheel 27 thereby offering a smaller resistance to rotation of the cage 16 and corresponding smaller resistance to rotation of the shaft 11. In other words, the relative increase and decrease of speeds of the differentially driven shafts 11 and 12 is in inverse ratio.

It will thus be seen that the speeds of the two differentially driven shafts 11 and 12 are automatically varied in accordance firstly with the speed of rotation of the shaft 10 which varies in accordance with the power supply such as for example, in the case of road vehicles on operation of the throttle, and secondly with the load or resistance to movement of the shaft 12, no adjustment of the variable-speed gearing of the power transmission apparatus being required.

Again it will be appreciated that the only factor which can vary the speed of rotation of the flywheel about its own axis is the speed of the shaft 10, i. e., with constant speed of rotation of the shaft 10, the speed of rotation of the flywheel 27 remains constant or substantially so, independently of the actual proportion of power output transmitted to the shaft 12 which of course depends on the resistance to movement of said shaft 12. In other words as resistance to rotation of the shaft 12 decreases, so does its speed increase, with the result that the flywheel's rotary speed is maintained by virtue of the train of gears 18, 19, 21, 24 and 25 whilst as rotation imparted to the flywheel 27 by virtue of the rotation of the cage 16 decreases, the rotation imparted to the flywheel by the above train of gears increases, and in consequence the braking effect of the flywheel is maintained.

In the operation of the mechanism it will be appreciated also that the engine or other source of power supply for the shaft 10 is permitted to develop considerable brake horsepower before taking up the load on the shaft 12.

Figure 4:
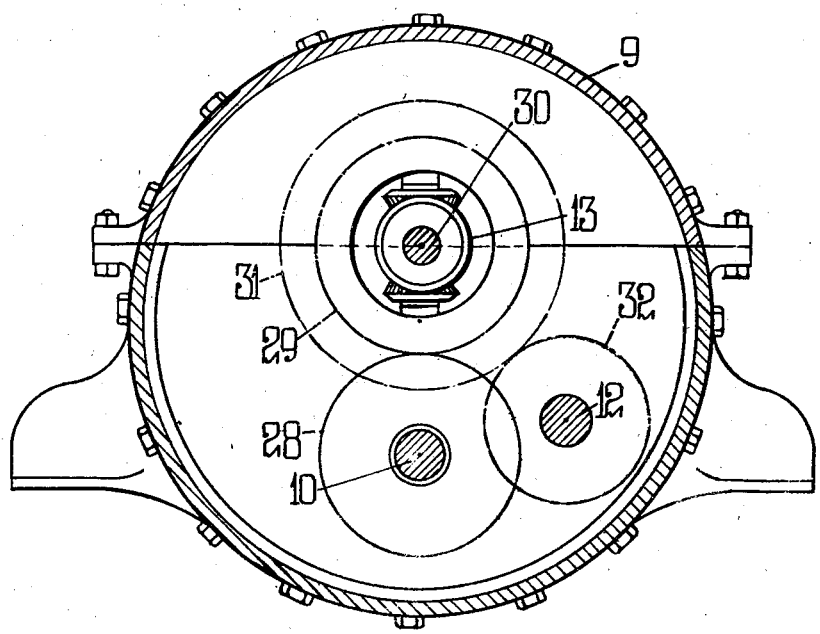
Figure 4 is a section on the line 4—4 of Fig. 2.
Figure 3:
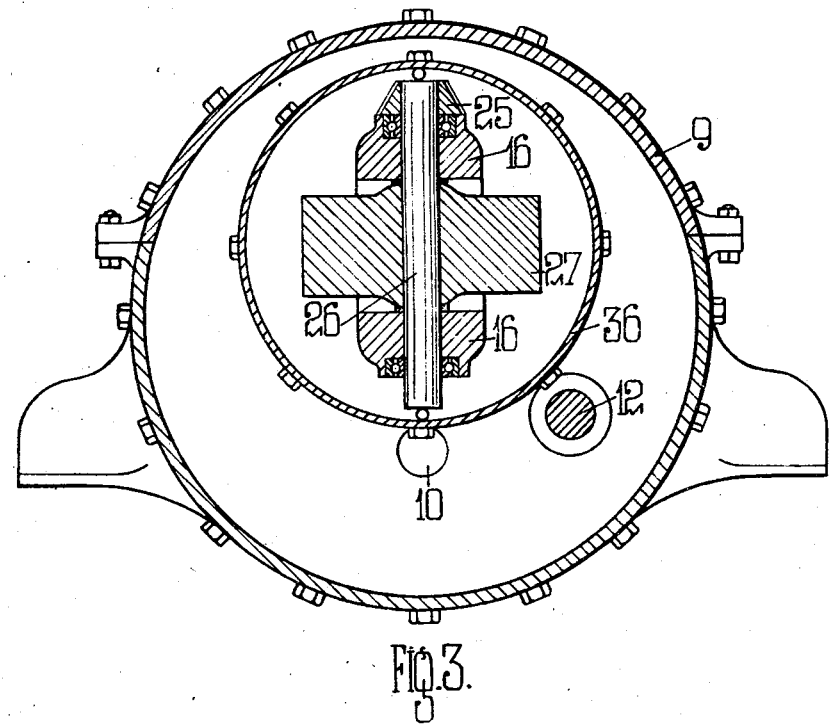
Figure 3 is a section on the line 3—3 of Fig. 2.

The construction according to Figures 2–4 differs primarily from the diagrammatic form of construction shown in Figure 1 in that the shafts 10, 11 and 12 are disposed in parallel relationship, whereas in the diagrammatic arrangement according to Figure 1 the shaft 10 is at right angles to the shafts 11 and 12. In Figures 2–4 the shaft 10 has keyed thereto a spur wheel 28 which meshes with a toothed wheel 29 of the differential gear 13, one wheel of which rotates with the differentially driven shaft 11 and the wheel opposite thereto rotates with a differential shaft 30 to which is keyed a spur wheel 31 in mesh with a spur wheel 32 keyed to the differential and power output shaft 12.

The wheels 28, 29 and the differential 13 are located within the housing 9 whilst that part of the power output or propeller shaft 12 which projects through the end wall of the housing 9 has keyed thereto a spur wheel 33 in mesh with a spur wheel 34 on the countershaft 20.

The countershaft 20 is splined at 35 to receive a casing 36 which houses the cage 16 of the flywheel 27, the left hand end of the cage 16 engaging with the differential shaft 11 at a splined part of the latter.

As in the construction according to Figure 1 the flywheel 27 is keyed to the flywheel shaft 26 which is at right angles to the cage 16, but in this construction the flywheel shaft projects through the ends of the cage 16 where it carries a bevel wheel 25 adapted to mesh with a bevel wheel or track 37 consisting of an annulus rigid with the inner periphery of the casing 36. In this construction, one limit of relative speeds of the differential shaft 11 on the one hand and the associated differential shafts 30 and 12 on the other hand is when the drive from the power input shaft 10 is transmitted through the wheels 28, 29, the differential 13, the differential shaft 11, the cage 16, the bevel wheels 25, 37 the casing 36, the countershaft 20 and the spur wheels 34, 33, to the power output shaft 12. The other limit of relative speeds occurs when the power is transmitted from the input shaft 10 through the spur wheels 28, 29, the differential 13, the differential shaft 30 and the spur wheels 31, 32 to the power output shaft 12. As in the construction according to Figure 1 the inertia effect created by rotation of the flywheel 27 about its own axis applies braking load on the cage 16 to vary the transmission through the shafts 11 and 12 and with increase of speed of the flywheel the greater is the braking load and the smaller is the amount of power transmitted through the shaft 11 and cage 16 to the countershaft 20, the spur wheels 34, 33 and the shaft 12, and the greater is the power transmitted through the shaft 30 and the spur wheels 31, 32 to the shaft 12.

If desired, means may be provided for varying the radius of gyration or effective mass of the flywheel 27, such as for example, by displaceable mass elements on the flywheel.

Again if desired power for rotating the flywheel may be obtained from an electric motor or other source independently of the source of power supply for the shaft 10 thereby permitting variation of the speed of rotation of the flywheel when desired.

I declare that what I claim is:

1. Power transmission apparatus comprising a power input shaft, a differential gear including a wheel rotatable with said input shaft, a pair of differentially driven shafts driven by opposite wheels of said differential gear, a flywheel rotatable about its own axis and about an axis at right angles thereto, means connected with one of said differentially driven shafts for driving the flywheel about one of said axes, means connected to the other of said differentially driven shafts for driving the flywheel about the other of said axes, and a gear connection between said means connected to the shafts.

2. Power transmission apparatus comprising a power input shaft, a differential gear including a toothed wheel rotatable with said input shaft, a pair of differentially driven shafts driven by said gear, one of which shafts constitutes the propeller shaft of the mechanism to be driven, a flywheel, means connected to said propeller shaft for rotating said flywheel about its own axis, means connected to the other differentially driven shaft for rotating said flywheel about an axis at right angles to the flywheel axis, and planetary gearing between said flywheel rotating means enabling said flywheel on rotation about its own axis to have its rotation about an axis at right angles thereto varied in accordance with the load on said propeller shaft.

3. Power transmission apparatus comprising a rotary cage, a flywheel rotatable about an axis normal to that of the cage, a power input shaft, a differential gear driven by said input shaft, a pair of differentially driven shafts associated with said differential gear and with one of which said cage is rotated at a predetermined gear ratio and a countershaft rotatable at a predetermined gear ratio with said other differential shaft for rotating said flywheel to generate an inertia effect for braking rotating of said cage.

4. Power transmission apparatus comprising a power input shaft, a differential gear including a wheel rotatable with said shaft, a pair of shafts differentially driven by said gear, a countershaft rotatable with one of said differentially driven shafts, a cage rotatable with the other of said differentially driven shafts, a flywheel the axis of which lies normal to that of the cage and planetary gearing between said flywheel and said cage and countershaft, the inertia effect of said flywheel when rotating under the action of said planetary gear tending to brake said cage and to transmit the drive from said input shaft to said countershaft and differential shaft associated therewith in dependence on the resistance to movement of said associated differential shaft.

5. Power transmission apparatus as claimed in claim 3 and wherein the cage is coupled for rotation at a predetermined gear ratio with one of the differentially driven shafts, houses the flywheel, and forms a bearing for one end of a countershaft, which is adapted to rotate the flywheel and which itself rotates at a predetermined gear ratio with the other differentially driven shaft.

6. Power transmission apparatus as claimed in claim 3 and wherein a planetary gearing is provided between the countershaft and the cage which is coupled for rotation at a predetermined gear ratio with one of the differentially driven shafts, houses the flywheel and forms a bearing for one end of the countershaft which is adapted to rotate the flywheel and which itself rotates at a predetermined gear ratio with the other differentially driven shaft.

7. Power transmission apparatus as claimed in claim 3 and wherein a planetary gearing is provided between the countershaft and the cage and the countershaft carries a spur wheel which drives a pinion on a lay shaft extending longitudinally within and carried by a cage, the said lay shaft having a bevel wheel in mesh with a bevel wheel on the flywheel shaft.

8. Power transmission apparatus as claimed in claim 3 and wherein the cage is directly driven by one of the differentially driven shafts whilst the axis of the flywheel projects through the periphery of the cage and carries a bevel wheel in mesh with a bevel gear on the inner periphery of a casing coaxial with said cage, the said casing rotating in unison with the countershaft.

ANDREW JAMES LENOX.